US 6,649,559 B2
Nov. 18, 2003

(54) SUPPORTED METAL MEMBRANE, A PROCESS FOR ITS PREPARATION AND USE

(75) Inventors: Ernst Drost, Rannenbergring (DE);
Werner Kuhn, Rodenbach (DE);
Meike Roos, Biebergemünd (DE);
Stefan Wieland, Offenbach (DE);
Bernd Kempf, Kleinwallstadt (DE)

(73) Assignee: dmc2 Degussa Metals Catalysts Cerdec AG, Hanau (DE)

(*) Notice: Subject to any disclaimer, the term of this patent is extended or adjusted under 35 U.S.C. 154(b) by 0 days.

(21) Appl. No.: 09/912,439

(22) Filed: Jul. 26, 2001

(65) Prior Publication Data
US 2002/0020298 A1 Feb. 21, 2002

(30) Foreign Application Priority Data
Aug. 12, 2000 (DE) .......................... 100 39 596

(51) Int. Cl.⁷ .............. B01J 21/18; B32B 3/00; B01D 53/22; B01D 59/12
(52) U.S. Cl. ............... 502/182; 502/439; 502/527.12; 502/527.15; 502/527.24; 428/312.8; 428/319.1; 428/116; 428/613; 428/553; 95/55; 95/56; 96/4; 96/11
(58) Field of Search .............. 502/182, 527.12, 502/527.15, 527.24, 439; 428/319.1, 312.8, 116, 613, 553; 95/55.56; 96/4, 11

(56) References Cited

U.S. PATENT DOCUMENTS

| | | | |
|---|---|---|---|
| 3,505,180 A | | 4/1970 | Brogden ............... 204/35 |
| 3,533,863 A | | 10/1970 | Lee et al. ............. 156/18 |
| 3,640,832 A | * | 2/1972 | Kurz ................... 161/160 |
| 4,687,702 A | * | 8/1987 | Monsees ............... 428/308.4 |
| 4,857,080 A | * | 8/1989 | Baker et al. ............ 55/16 |
| 5,393,325 A | * | 2/1995 | Edlund ................ 95/56 |
| 5,498,278 A | * | 3/1996 | Edlund ................ 96/11 |
| 5,645,626 A | * | 7/1997 | Edlund et al. ......... 95/56 |
| 5,734,092 A | | 3/1998 | Wang et al. ........... 73/23 |
| 5,738,708 A | * | 4/1998 | Peachey et al. ........ 95/56 |
| 5,904,754 A | | 5/1999 | Juda et al. ........... 96/11 |
| 5,958,091 A | | 9/1999 | Sakai et al. .......... 48/61 |

(List continued on next page.)

FOREIGN PATENT DOCUMENTS

| | | |
|---|---|---|
| DE | 197 38 513 C1 | 11/1998 |
| EP | 0 924 161 A2 | 6/1999 |
| EP | 0 924 162 A2 | 6/1999 |
| EP | 0 924 163 A2 | 6/1999 |
| EP | 0 945 174 A1 | 9/1999 |
| GB | 1208 962 A | 10/1970 |
| GB | 1 292 025 | 10/1972 |
| WO | WO 89/04556 | 5/1989 |
| WO | WO 99/33545 A | 7/1999 |

OTHER PUBLICATIONS

Shigeyuki Uemiya et al., Hydrogen Permeable Palladium–Silver Alloy Membrane Supported On Porous Ceramics, Journal of Membrane Science, 56, Mar. 1991, No. 3, Amsterdam, NL.

(List continued on next page.)

*Primary Examiner*—Mark L. Bell
*Assistant Examiner*—Patricia L. Hailey
(74) *Attorney, Agent, or Firm*—Kalow & Springut LLP

(57) ABSTRACT

The invention provides a supported metal membrane which contains a metal membrane on a support surface of a porous membrane support. The supported metal membrane is obtainable by applying the metal membrane to the support surface of the membrane support, wherein the pores in the membrane support are sealed, at least in the region of the support surface, prior to applying the metal membrane and are opened by removing the auxiliary substance only after applying the metal membrane.

23 Claims, 3 Drawing Sheets

U.S. PATENT DOCUMENTS

Figure 1:
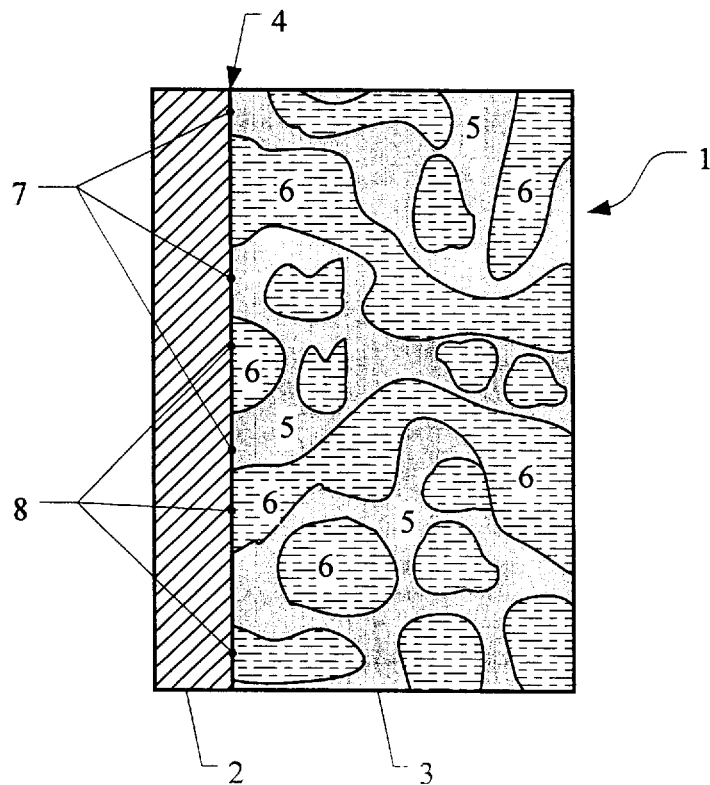

| | | | |
|---|---|---|---|
| 6,027,796 A | * | 2/2000 | Kondoh et al. ........... 428/312.8 |
| 6,066,592 A | * | 5/2000 | Kawae et al. ................ 502/439 |
| 6,152,987 A | * | 11/2000 | Ma et al. ....................... 95/56 |
| 6,159,610 A | * | 12/2000 | Paranthaman et al. ....... 428/472 |
| 6,165,600 A | * | 12/2000 | Ivkovich, Jr. et al. ....... 428/213 |
| 6,231,831 B1 | * | 5/2001 | Autenrieth et al. ....... 423/648.1 |
| 6,306,515 B1 | * | 10/2001 | Goedjen et al. ............. 428/469 |
| 6,306,525 B1 | * | 10/2001 | Schicht et al. ............... 428/633 |
| 6,315,820 B1 | * | 11/2001 | Saloka et al. ................... 96/11 |
| 6,361,857 B1 | * | 3/2002 | Saito et al. .............. 428/319.1 |
| 6,372,363 B1 | * | 4/2002 | Krueger ...................... 428/606 |
| 6,403,209 B1 | * | 6/2002 | Barton et al. ............ 428/307.7 |
| 2002/0028345 A1 | * | 3/2002 | Kempf et al. ................ 428/670 |

OTHER PUBLICATIONS

T. S. Moss et al. "Composite Metal Membranes for Hydrogen Separation Applications" *Porc.–Natl. Hydrogen Assoc. Annu. U.S. Hydrogen Meeting* 8$^{th}$ (1997), pp. 357–365.

T. S. Moss et al. "Multilayer Metal Membranes for Hydrogen Separation" *Int. J. Hydrogen Energy* vol. 23, No. 2, (1998) pp. 99–106.

WPIDS–140642 for JP 05078810 (Abstract) Mar. 1999.

Y. Lin et al. "An Integrated Purification and Production of Hydrogen With a Palladium Membrane–Catalytic Reactor" *Catalysis Today* 44 (1998) pp. 343–349.

Y. Lin et al. "Process Development For Generating High Purity Hydrogen By Using Supported Palladium Membrane Reactor as Steam Reformer as Steam Reformer" *Int. J. Hydrogen Energy* 25 (2000) pp. 211–219.

E. Kikuchi "Membrane Reactor Application to Hydrogen Production" *Catalysis Today* 56 (2000) pp. 97–101.

* cited by examiner

SUPPORTED METAL MEMBRANE, A PROCESS FOR ITS PREPARATION AND USE

DESCRIPTION

The invention provides a supported metal membrane which contains a metal membrane on a porous membrane support, as well as a process for its preparation and its use. Supported metal membranes of this type are used for separating gas mixtures, in particular for the separation of hydrogen from a reformate gas for supplying fuel cells with the required fuel gas.

For this purpose, palladium or palladium alloy membranes on either porous or non-porous supports are normally used, such as compact palladium or palladium alloy membranes. Foils made of hydrogen-permeable metals, inter alia, are used as non-porous supports. The permeability of the membranes for hydrogen increases with temperature. Typical operating temperatures are therefore between 300 and 600° C.

T. S. Moss and R. C. Dye [Proc.-Natl. Hydrogen Assoc. Annu. U.S. Hydrogen Meet., 8th (1997), 357–365] and T. S. Moss, N. M. Peachey, R. C. Snow and R. C. Dye [Int. J. Hydrogen Energy 23(2), (1998), 99–106 ISSN: 0360–3199] describe the preparation and use of a membrane which is obtained by applying Pd or PdAg by cathode sputtering (atomization) to both faces of a foil of a metal from group 5B. The thickness of the layers applied to the two faces may be varied so that an asymmetric component is produced (for example: 0.1 $\mu$m Pd/40 $\mu$m V/0.5 $\mu$m Pd). Permeation trials demonstrate twenty-fold higher hydrogen permeation as compared with self-supported Pd membranes. Accordingly, the membrane described is suitable for use in a PEM fuel cell system instead of the traditional catalytic gas purification steps (water gas shift reaction and preferential oxidation of CO).

GB 1 292 025 describes the use of iron, vanadium, tantalum, nickel, niobium or alloys thereof as a non-porous support for a non-coherent, or porous, palladium (alloy) layer. The palladium layer is applied by a pressing, spraying or electrodeposition process in a thickness of about 0.6 mm to a support with a thickness of 12.7 mm. Then the thickness of the laminate produced in this way is reduced to 0.04 to 0.01 mm by rolling.

According to DE 197 38 513 C1, particularly thin hydrogen separation membranes (thickness of layer less than 20 $\mu$m) can be prepared by alternate electrodeposition of palladium and an alloy metal from group 8 or 1B of the periodic system of elements to a metallic support which is not specified in any more detail. To convert the alternating layers into a homogeneous alloy, appropriate thermal treatment may follow the electrodeposition process.

Either metallic or ceramic materials are suitable as porous supports for palladium (alloy) membranes. In accordance with JP 05078810 (WPIDS 1993-140642), palladium may be applied to a porous support by a plasma spray process for example.

According to Y. Lin, G. Lee and M. Rei [Catal. Today 4.4 (1998) 343–349 and Int. J. of Hydrogen Energy 25 (2000) 211–219] a defect-free palladium membrane (thickness of layer 20–25 $\mu$m) can be prepared on a tubular support made of porous stainless steel 316L in a electroless plating process and integrated as a component in a steam reforming reactor. At working temperatures of 300 to 400° C., a purified reformate containing 95 vol. % $H_2$ is obtained. However, the optimum working temperature is very restricted because below 300° C. the palladium membrane starts to become brittle due to the presence of hydrogen, whereas above 400 to 450° C. the alloying constituents in the stainless steel support diffuse into the palladium layer and lead to impairment of the permeation properties.

Electroless plating processes are preferably used for coating ceramic supports. Thus, CVD coating of an asymmetric, porous ceramic with palladium is described by E. Kikuchi [Catal. Today 56 (2000) 97–101] and this is used in a methane steam reforming reactor for separating hydrogen from the reformate. The minimum layer thickness is 4.5 $\mu$m. If the layer is thinner, the gas-tightness of the layer can no longer be guaranteed. Apart from CVD coating with pure Pd, coating with palladium alloys is also possible, wherein the alloy with silver prevents embrittlement of the palladium membrane and increases the permeability to hydrogen.

In addition to pure hydrogen separation membranes, membranes which are provided with a reactive layer in addition to the hydrogen separation layer (palladium) are also described for applications in fuel cell systems. Thus, the porous support for a palladium (alloy) membrane may be covered, for example on the face which is not coated with Pd, with a combustion catalyst. The heat released during combustion at the reactive face is then simultaneously used to maintain the operating temperature of the hydrogen separation membrane (EP 0924162 A1). Such a component may then be integrated in the reforming process downstream of a reformer or incorporated directly in the reformer (EP 0924161 A1, EP 0924163 A1).

In addition, not only palladium membranes can be used for hydrogen separation in the fuel cell sector. EP 0945174 A1 discloses a design for the use of universally constructed layered membranes which may contain both fine-pore, separation-selective plastics and/or several ceramic layers and/or layers made of a separation-selective metal (preferably from groups 4B, 5B or 8), wherein these layers are applied to a porous support (glass, ceramic, expanded metal, carbon or porous plastics).

The objective of developing metal membranes for the separation of hydrogen from gas mixtures is to obtain high rates of permeation for the hydrogen. For this purpose, the metal membrane must be designed to be as thin as possible while avoiding the occurrence of leakiness in the form of holes. Such membranes can be processed only in a supported form. In order for the membrane support to have as little effect as possible on the permeation of hydrogen, it must have a high porosity. Thus there is the difficulty, in the case of known processes for preparing supported membranes, of depositing a defect-free membrane on a porous support. There are two problems involved here. On the one hand, the methods described for depositing for example palladium or a palladium alloy can guarantee a relatively defect-free membrane layer only above a certain thickness of layer. This minimum thickness is about 4 to 5 $\mu$m. On the other hand, the coating techniques used for applying the membrane layer to the porous membrane support means that the average pore diameter of the membrane support ought not exceed a certain value because otherwise it would be impossible to apply coherent and defect-free coatings. The pore sizes of known membrane support materials, such as porous ceramics or porous metal supports, are therefore less than 0.1 $\mu$m. This means that the resistance to flow of the gas through the pores cannot be reduced to a desirable extent.

WO 89/04556 describes an electrochemical process for preparing a pore-free membrane based on palladium supported by a porous metal structure. In accordance with the process, a pore-free palladium(-silver) membrane on a porous, metallic support is produced by coating one face of a metal alloy foil (preferably brass) with palladium or palladium/silver (thickness of palladium layer: about 1 µm) using an electrodeposition process. The porosity of the support is produced later by dissolving the base components out of the brass foil. Dissolution is performed electrochemically, wherein, in a cyclic process, both components are first taken into solution but the more base component is redeposited directly onto the palladium layer (electrochemical recrystallisation). The less base component in the foil-shaped alloy thus goes virtually quantitatively into solution so that a porous metal structure, preferably a porous copper structure, remains as a support for the palladium/silver membrane.

The process in accordance with WO 89/04556 has the disadvantage that the brass foil used as support is virtually completely dissolved and has to be built up again by electrochemical recrystallisation. This means that the composite or laminate formed between the palladium layer and the support foil is destroyed. The mechanical strength of the recrystallised foil is low and its porosity is undefined.

The object of the present invention is to provide a supported metal membrane for the separation of hydrogen from gas mixtures which can be prepared by a simple and cost-effective process. Another object of the invention are supported metal membranes, in which the membrane support has a hitherto unrealisable, high, porosity (average pore sizes and pore volumes). A further object of the present invention are composite metal membranes in which the average pore size of the membrane support is greater than the thickness of the metal membranes.

This object is achieved by a supported metal membrane which contains a metal membrane on a support surface of a porous membrane support. The supported metal membrane can be obtained by applying the metal membrane to the support surface of the membrane support, wherein the pores in the membrane support are sealed by an auxiliary substance, at least in the area of the support surface, prior to application of the metal membrane and are opened by removing the auxiliary substance only after applying the metal membrane.

In the context of the present invention, the support surface of the membrane support and its contact surfaces are differentiated. The support surface includes the entire surface area which is available for coating with the metal membrane, that is the surfaces of the pores sealed with auxiliary substance, which they have in the plane of the support surface, and also the direct contact surfaces of the membrane support with the metal membrane after removal of the auxiliary substance.

The metal membrane according to the invention is obtainable, for example, by choosing a porous membrane support in which the pores are sealed with an auxiliary substance, either completely or only in the region of the intended support surface. The membrane support preferably consists of a porous metal, a metal alloy, a sintered metal, a sintered steel, a glass or a ceramic. The pores in these materials are sealed prior to application of the metal membrane by, for example, a chemically readily removable metal, a salt, graphite, a polymer or a high molecular weight organic compound.

Before applying the metal membrane, it is recommended that the support surface of the membrane support be smoothed by suitable means such as grinding and polishing and in particular that the subsequent contact surfaces with the metal membrane be exposed and cleaned. The high surface quality produced in this way is transferred to the metal membrane being applied and is retained even after removing the auxiliary substance so that the final supported metal membrane has a very flat structure with a uniform layer thickness.

Depending on the properties of the auxiliary substance and the membrane support, the auxiliary substance can be removed from the pores of the membrane support in a variety of ways such as, for example, by melting, burning out, dissolving, chemical dissolution and electrochemical dissolution.

Electrochemical deposition or PVD or CVD processes are suitable for applying the metal membrane to the membrane support. A preferred PVD-process for depositing the metal membrane onto the membrane support is cathode sputtering. This process generally results in very dense layers with low porosity, i.e. with high packing density.

The just described process for the preparation of a supported metal membrane according to the invention includes the following steps:
  a) filling the pores of the porous membrane support with the auxiliary substance,
  b) smoothing and cleaning the support surface,
  c) applying the metal membrane to the support surface and
  d) removing the auxiliary substance from the pores of the membrane support.

Another possibility for preparing a supported membrane comprises choosing an initially non-porous membrane support which has a potential porosity. The term "potential porosity" indicates that the membrane support has an inhomogeneous structure, wherein the subsequent pores are filled by an auxiliary substance which is removed only after applying the metal membrane to the support surface of the membrane support.

This can be achieved in a simple manner when the membrane support consists of a multi-phase eutectic alloy and the auxiliary substance is formed by the more base (more electronegative) phase arranged in phase domains and this is electrochemically dissolved with the production of pores after application of the metal membrane. The eutectic alloy AgCu which consists of a Cu-rich and an Ag-rich alloy phase is especially suitable for this purpose. The Cu-rich phase is more electronegative and can be selectively dissolved out of the membrane support with the production of the desired porosity using an electrochemical route. The Ag-rich phase then remains almost untouched. Whereas, in accordance with WO 89/04556, the membrane support is completely dissolved and rebuilt, according to the present invention a rigid framework of the Ag-rich alloy phase is retained, with corresponding positive effects on the stability of the membrane support.

The copper content of the eutectic alloy is preferably between 20 and 80 wt. %, with respect to the total weight of alloy. By suitable thermal treatment of the support at 400 to 750° C., before or after applying the metal membrane, its overall structure, and thus its subsequent porosity, can be affected in an advantageous manner.

To summarise: the process for preparation of a supported metal membrane according to the invention using a membrane support made from an eutectic alloy as described above comprises the following process steps:
  a) cleaning the support surface of the membrane support,
  b) applying the metal membrane to the support surface,
  c) treating the laminate of metal membrane and membrane support at temperatures between 300 and 700° C. and d) electrochemically dissolving the more base phase in the membrane support.

The supported metal membrane according to the invention is preferably used as a gas separation membrane for the separation of hydrogen from gas mixtures. In this case, the metal membrane is preferably prepared from palladium or a palladium alloy, for example from PdAg23, PdCu40 or PdY10.

A small thickness of metal membrane is required for use as a gas separation membrane in order to ensure the highest possible permeability for the desired gas. Gas separation membranes of palladium or palladium alloys with a thickness of more than 20 $\mu$m are of only small interest for the separation of hydrogen from gas mixtures due to the high cost of the noble metal and the low permeability. Membranes with a thickness of less than 0.3 $\mu$m may have a number of defects. In addition, the permeability for undesired gases also increases at these small thicknesses. As a result of these two effects, the separating power of a membrane with a membrane thickness of less than 0.3 $\mu$m drops to values which are no longer tolerable. Therefore the metal membrane preferably has a thickness between 0.3 and 5, preferably between 0.5 and 3 $\mu$m.

The porous metallic membrane support is used to support the thin metal membrane, wherein the membrane support should impair the permeability of the metal membrane as little as possible, as compared with a freely suspended metal membrane of the same thickness. On the other hand, a certain minimum thickness is required in order to ensure requisite mechanical stability of the supported membrane. The thickness of the membrane support should therefore be less than 100 $\mu$m and should not be less than 20 $\mu$m. Thicknesses of the membrane support between 0.50 and 20 $\mu$m are preferably striven for.

When using the supported metal membrane as a gas separation membrane for hydrogen containing gas mixtures it has to withstand strongly varying operating conditions with time. This leads to temporal changes of membrane volume and dimensions as a result of incorporation and release of hydrogen and temperature changes. Changes in dimension of the membrane should be comparable to those of the membrane support to avoid disruption of the supported metal membrane. Therefore, metal composite membranes (metal membrane on a metallic membrane support) are preferred over heterogeneous metal-ceramic-composites (metal membrane on a ceramic support) when changes to volume or dimensions due to temperature changes are a problem. The thermal expansion coefficients of two metals exhibit less differences than the expansion coefficients of a metal and a ceramic.

From the above mentioned membrane materials PdAg23, PdCu40 and PdY10 the alloy PdAg23 is subject to considerably stronger changes in dimension and volume due to hydrogen incorporation than the alloy PdCu40. Therefore, a metal membrane made from PdCu40 on a membrane support based on AgCu is the preferred metal composite membrane for purifying hydrogen.

It is often an advantage to build up the metal membrane as a multilayered structure. In this case, it is possible to design the first layer, lying directly on the membrane support, as a diffusion barrier. The diffusion barrier should prevent, in particular for metallic membrane supports, any change in alloy composition in the metal membrane due to diffusion of alloy constituents into the membrane or out of the membrane taking place when using the supported metal membrane. A change in alloy composition of this type may have a considerable effect on the permeability of the metal membrane. Ceramic oxides such as, for example, aluminium oxide, titania and ceria are suitable as diffusion barriers. As an alternative to diffusion barriers from oxidic materials metal layers from vanadium, tantalum or niobium can be employed. These metals have a good permeability for hydrogen. The thickness of these diffusion barrier layers should be less than 0.5 $\mu$m in the case of oxide layers and less than 2 $\mu$m in the case of a metal barrier. Preferably the thickness of the barrier layer is less than 0.1 $\mu$m in both cases.

When using the supported metal membrane to purify reformate gas, it may be expedient to combine the supported metal membrane with a catalyst. For this purpose, a catalytically active coating is applied to the surface of the porous membrane support opposite to the metal membrane. Alternatively, a functional layer to remove impurities and harmful substances may be applied instead of the catalytically active coating.

The supported membrane according to the invention is preferably used for the separation of hydrogen from gas mixtures, in particular from reformate gases. The invention enables the preparation of supported metal membranes in which the membrane supports have a hitherto unrealisable, high, porosity (average pore sizes and pore volumes). With thicknesses of gas separation membrane of 0.3 to 5, preferably 0.5 to 3 $\mu$m, the membrane support has an average pore size greater than 0.5 and less than 10 $\mu$m. Thus, for the first time a supported metal membrane is described here in which the average pore size of the membrane support is greater than the thickness of the metal membrane. It therefore has outstanding hydrogen permeability.

In general, the supported metal membrane will be used in the form of plane foils. But the metal membrane can also be produced in the form of varying geometrical structures which have the additional advantage of improved mechanical stability compared to plane foils of the same thickness. In particular, the supported metal membrane can be manufactured in the form of thin tubules.

Figure 2:
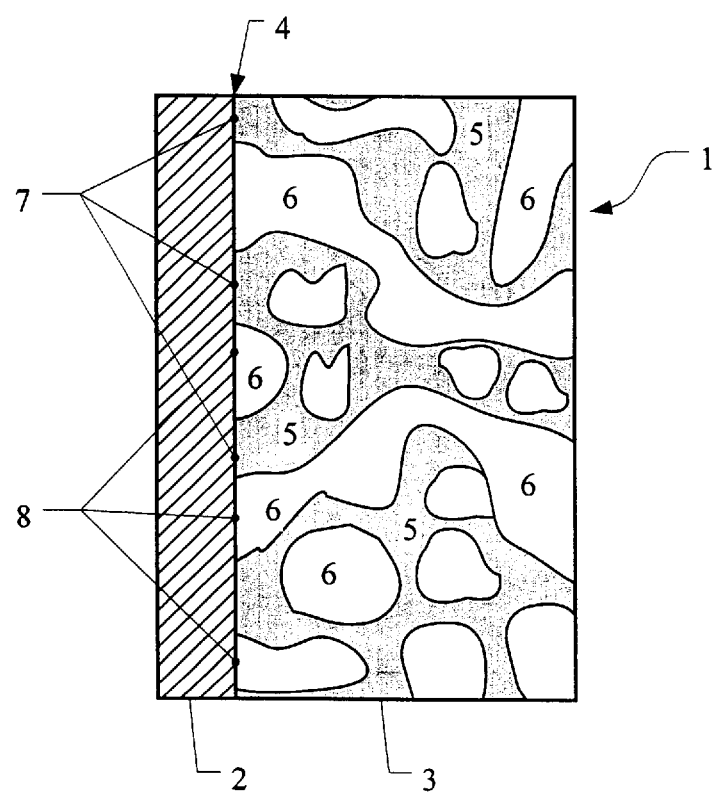
Figure 3:
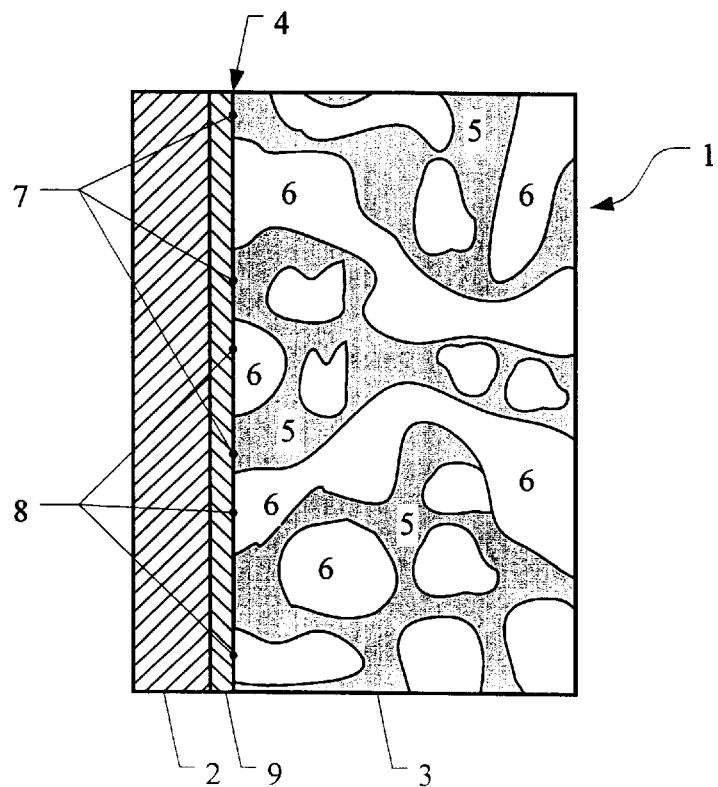
Figure 4:
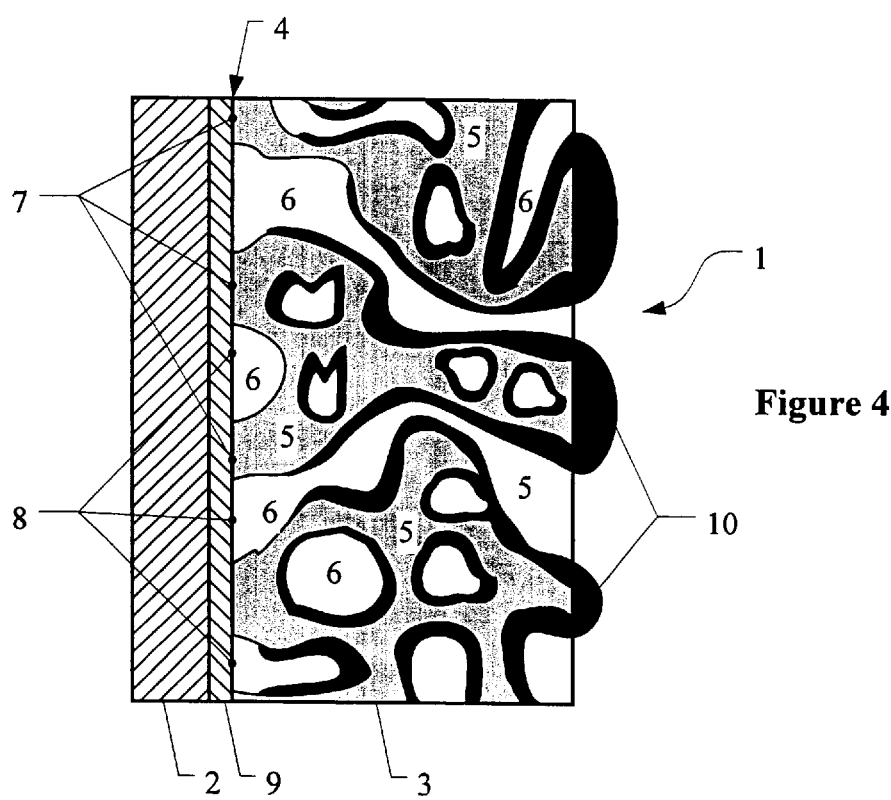
Figure 5:
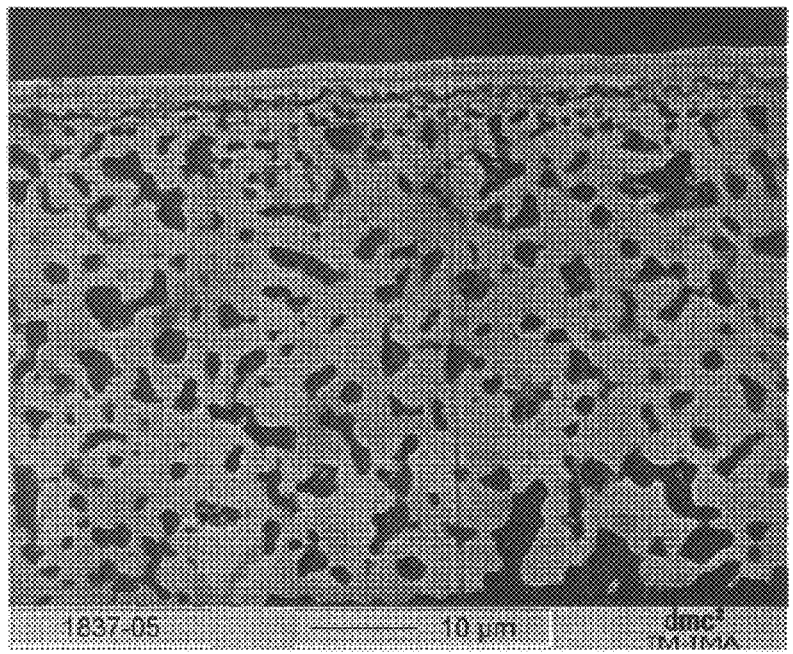
Figure 6:
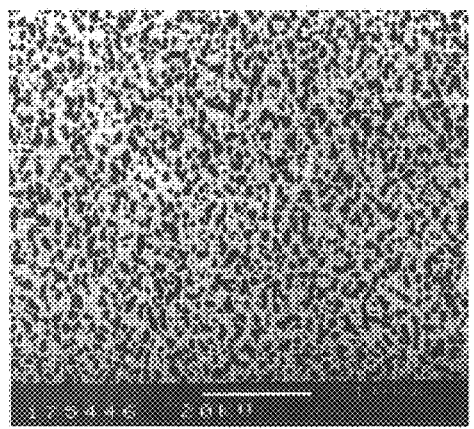

The invention is explained in more detail by means of FIGS. 1 to 6 and the following examples:

FIG. 1: idealised cross section of a supported metal membrane according to the invention before the auxiliary substance is removed from the pores of the membrane support FIG. 2: idealised cross section of a supported metal membrane according to the invention after the auxiliary substance has been removed from the pores of the membrane support FIG. 3: idealised cross section of a supported metal membrane according to the invention with a diffusion barrier layer between metal membrane and membrane support FIG. 4: idealised cross section of a supported metal membrane according to the invention with a diffusion barrier layer between metal membrane and membrane support and with a catalytic coating on the surface of the membrane support opposite to the metal membrane FIG. 5: cross section of an experimental PdAg-membrane on a AgCu-membrane support taken with a raster electron microscope FIG. 6: porous structure of a membrane support consisting of an eutectic AgCu-alloy after dissolution of the Cu-rich phase FIG. 1 shows an idealised illustration of a cross section of a supported metal membrane according to the invention before the auxiliary substance is removed from the pores of the membrane support. Reference numeral (1) denotes the composite metal membrane, i.e. the composite comprising the metal membrane (2) and the membrane support (3). The surface area of the membrane support at the interface between the metal membrane and the membrane support is the formerly defined support surface (4). The support surface is composed of different surface areas which comprise areas (7) formed by the membrane support material (5) and areas (8) formed by the pores (6) filled with the auxiliary substance in the plane of the support surface (4). The areas (8) have been defined as contact surfaces beforehand.

FIG. 2 shows the same cross section as in FIG. 1 after removing of the auxiliary substance from the pores of the membrane support.

During operation of the supported metal membrane as gas separation membrane for cleaning of hydrogen, material of the membrane support may diffuse into the metal membrane (2) and lead to unintentional reduction of the hydrogen permeability of the metal membrane. For lowering this diffusion a diffusion inhibiting barrier (9) can be introduced between metal membrane (2) and membrane support (3). FIG. 3 shows a cross section of a composite membrane according to this invention with such a diffusion barrier between membrane and support. Suitable materials for the diffusion barrier are alumina, titania and ceria and metal layers made from vanadium, tantalum or niobium as already mentioned above.

FIG. 4 shows an embodiment of the supported metal membrane according to the invention having a functional layer (10) deposited onto the surface of the membrane support opposite to the metal membrane. The functional layer may be a catalytic layer for converting carbon monoxide by water gas shift reaction, a layer for oxidising carbon monoxide to carbon dioxide or the functional layer may be an absorbing layer for absorbing sulphur components such as hydrogen sulphide.

EXAMPLE 1

Thin Pd layers with layer thicknesses of 0.1, 0.5 and 2 $\mu$m were prepared on foils of AgCu28 by electrodeposition. The AgCu28 foil had a thickness of 50 $\mu$m.

After thermal treatment of the coated foils under a protective gas (argon) at 600° C. for a period of 30 min, the Cu-rich phase was dissolved out of the AgCu28 alloy material in the membrane support. Dissolution was performed anodically in a sulfuric acid electrolyte using 10% strength sulfuric acid operated potentiostatically at 40° C. and with a constant bath voltage of 230 mV over the course of 20 hours. This produced an open-pore structure in the membrane support foil.

Metallographic examination and images produced by a scanning electron microscope over the cross-section of the finally produced supported metal membrane showed a firmly adhering, dense Pd membrane on a porous AgCu support layer with open porosity and a pore size of 1 to 5 $\mu$m.

EXAMPLE 2

Using a PdAg23 target a PdAg23 layer, 2 $\mu$m in thickness, was deposited onto a foil of AgCu28 by cathode sputtering.

After thermal treatment of the coated foil under a protective gas (argon) at 600° C. for a period of 30 min, the Cu-rich phase was dissolved out of the AgCu28 alloy material in the membrane support. Dissolution was performed anodically in a sulfuric acid electrolyte using 10% strength sulfuric acid operated potentiostatically at 40° C. and with a constant bath voltage of 230 mV over the course of 20 hours. This produced an open-pore structure in the membrane support foil.

FIG. 5 shows the cross section of the thus produced metal composite membrane taken with a scanning electron microscope after dissolution of the Cu-rich phase of the membrane support. From FIG. 5 the large pore structure of the membrane support can clearly be seen. The average pore size is larger than the thickness of the metal membrane. The metal membrane has a flatness which had not been achievable if the metal membrane had been deposited onto a porous membrane support. As shown in FIG. 5, the average pore diameter increases with increasing distance from the metal membrane and is largest at the surface of the membrane support opposite to the metal membrane. This gradient pore structure is due to the anodic dissolution of the Cu-rich phase of the membrane support described above.

EXAMPLE 3

A further membrane support foil of AgCu28 was used to investigate the influence of thermal treatment on the formation of the pore structure. The Cu-rich phase was dissolved out of the foil as described in examples 1 and 2.

FIG. 6 shows a cross section of the membrane support foil after dissolution of the Cu-rich phase. The foil had been subjected to a different thermal treatment than the foils in the preceding examples. The average pore diameter of the pore structure is much smaller than in FIG. 5 and indicates that the porosity and its structure can be influenced by the thermal treatment of the eutectic membrane support during production of the membrane support foil.

Thermomechanical forming of the AgCu28 alloy during rolling to obtain the desired foil thickness and the secondary thermal treatment determine the pore structure of the final membrane support. Rapid cooling of the AgCu28 alloy during production leads to small phase regions and results in small average pore diameters after dissolution of the Cu-rich phase. Extended secondary thermal treatment after thermomechanical forming initiates re-crystallisation of the eutectic alloy and thus leads to an increase in size of the phase regions and to large average pore sizes of the completed membrane support as demonstrated in example 2. In addition, the size of the phase regions can be influenced by changing the overall composition of the alloy.

Though in the foregoing examples only membrane supports based on an eutectic AgCu28 alloy have been used, the invention is not restricted to the use of such eutectic alloys as membrane support materials. As already mentioned before, porous membrane supports can be used of which the pores have been filled with an auxiliary substance before deposition of the metal membrane and only after the application of the metal membrane is the auxiliary substance removed from the pores.

What is claimed is:

1. A supported metal membrane comprising a metal membrane on a support surface of a porous membrane support, wherein the pores of the membrane support are formed by electrochemically dissolving the copper-rich phase from eutetic alloy AgCu.

2. The supported metal membrane of claim 1, wherein the metal membrane consists of palladium or a palladium alloy.

3. The supported metal membrane of claim 2, wherein the palladium alloy is PdAg23, PdCu40 or PdY10.

4. The supported metal membrane of claim 1, wherein the metal membrane has a thickness of less than 5 $\mu$.

5. The supported metal membrane of claim 1, wherein the metal membrane has a thickness of 2 to 0.3$\mu$.

6. The supported metal membrane of claim 1, wherein the metal membrane is multilayered.

7. The supported metal membrane of claim 1, further comprising a diffusion barrier layer between the metal membrane and the membrane support.

8. The supported metal membrane of claim 1, wherein the supported metal membrane is in the form of a foil or tubule.

9. The supported metal membrane of claim 1, wherein the membrane support is in the form of a porous honeycomb.

10. The supported metal membrane of claim 1, further comprising a catalytically active coating on the surface of the porous membrane support opposite the metal membrane.

11. The supported metal membrane of claim 1, further comprising a functional layer on the surface of the porous membrane support opposite the metal membrane, wherein said functional layer is for removing impurities and harmful substances.

12. A method for preparing a supported metal membrane comprising:

filling the pores of a porous membrane support with an auxiliary substance in at least a region defining a support surface; then applying a metal membrane to the support surface; and then removing the auxiliary substance from the pores of the porous membrane support.

13. The method of claim 12, further comprising smoothing and cleaning the support surface after filling the pores of the porous membrane support.

14. The method of claim 12, wherein the porous membrane support is made from a porous metal, a metal alloy, a sintered metal, a sintered steel, a glass or a ceramic, and the auxiliary substance is a chemically readily removable metal, salt, graphite, polymer or high molecular weight organic compound.

15. The method of claim 12, wherein the metal membrane is applied by electrochemical deposition or by a PVD or a CVD process.

16. The method of claim 15, wherein the metal membrane is comprised of palladium or a palladium alloy.

17. The method of claim 16, wherein the metal membrane contains PdAg23, PdCu40 or PdY10.

18. A method for preparing a supported metal membrane comprising:

applying a metal membrane to a support surface of a membrane support consisting of a multi-phase eutectic alloy having a phase more base than another phase; then electrochemically dissolving the more base phase from the membrane support to form pores in the membrane support.

19. The method of claim 18, further comprising:

cleaning the support surface of the membrane support before applying the metal membrane, and heating the applied metal membrane and membrane support to a temperature between 300 and 700° C. before dissolving the more base phase from the membrane support.

20. The method of claim 18, wherein the multiphase eutectic alloy is AgCu.

21. The method of claim 18, wherein the metal membrane is applied by electrochemical deposition or by PVD or a CVD process.

22. The method of claim 21, wherein the metal membrane is comprised of palladium or a palladium alloy.

23. The method of claim 22, wherein the metal membrane contains PdAg23, PdCu40 or PdY10.

* * * * *